(12) United States Patent
Takamori et al.

(10) Patent No.: US 7,263,707 B2
(45) Date of Patent: Aug. 28, 2007

(54) INFORMATION PROCESSING MEDIUM AND INFORMATION PROCESSING APPARATUS USING THE SAME

(75) Inventors: Nobuyuki Takamori, Kitakatsuragi-gun (JP); Hideharu Tajima, Izumi (JP); Akira Takahashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 320 days.

(21) Appl. No.: 10/434,487

(22) Filed: May 7, 2003

(65) Prior Publication Data

US 2004/0030998 A1   Feb. 12, 2004

(30) Foreign Application Priority Data

May 14, 2002  (JP) .............................. 2002-138623

(51) Int. Cl.
*G11B 7/24* (2006.01)
(52) U.S. Cl. .................................................... 720/729
(58) Field of Classification Search ................ 369/283, 369/286; 428/702, 463; 257/E21.503; 204/192.23; 385/137, 102; 720/719
See application file for complete search history.

(56) References Cited

U.S. PATENT DOCUMENTS

| | | | | |
|---|---|---|---|---|
| 5,198,305 A | * | 3/1993 | Wada et al. ................. | 428/463 |
| 6,160,947 A | * | 12/2000 | Osugi et al. ................. | 385/137 |
| 6,195,489 B1 | * | 2/2001 | Oohashi et al. ............. | 385/102 |
| 6,657,948 B1 | * | 12/2003 | Tajima et al. ............... | 369/286 |
| 6,697,324 B2 | * | 2/2004 | Tajima et al. ............... | 369/283 |
| 6,776,882 B2 | * | 8/2004 | Dubs ..................... | 204/192.23 |
| 6,821,657 B1 | * | 11/2004 | Takahashi et al. ... | 257/E21.503 |
| 6,866,949 B2 | * | 3/2005 | Ota et al. .................... | 428/702 |
| 2003/0039201 A1 | * | 2/2003 | Fujii et al. .................. | 369/283 |

FOREIGN PATENT DOCUMENTS

| | | |
|---|---|---|
| EP | 0 410 183 | 1/1991 |
| EP | 1 031 972 | 8/2000 |
| JP | 03-232130 | 10/1991 |
| JP | 04-195745 | 7/1992 |
| JP | 04-364248 | 12/1992 |
| JP | 7-272320 | 10/1995 |
| JP | 10-064119 | 3/1998 |
| JP | 2001-250272 | 9/2001 |
| WO | WO0155243 A1 * | 8/2001 |

* cited by examiner

*Primary Examiner*—Tianjie Chen
(74) *Attorney, Agent, or Firm*—Edwards Angell Palmer & Dodge LLP; David G. Conlin; Lisa Swiszcz Hazzard

(57) ABSTRACT

An information processing medium includes a substrate, a single layered or multilayered thin film layer formed on the substrate, and a thin protective film formed to cover at least one surface of the thin film layer. The thin protective film is mainly comprised of a synthetic resin. At least either one of a Young's modulus and a linear expansion coefficient of the thin protective film has a value compensating a radial skew variation of the substrate caused by a change in ambient conditions.

10 Claims, 10 Drawing Sheets

FIG. 1
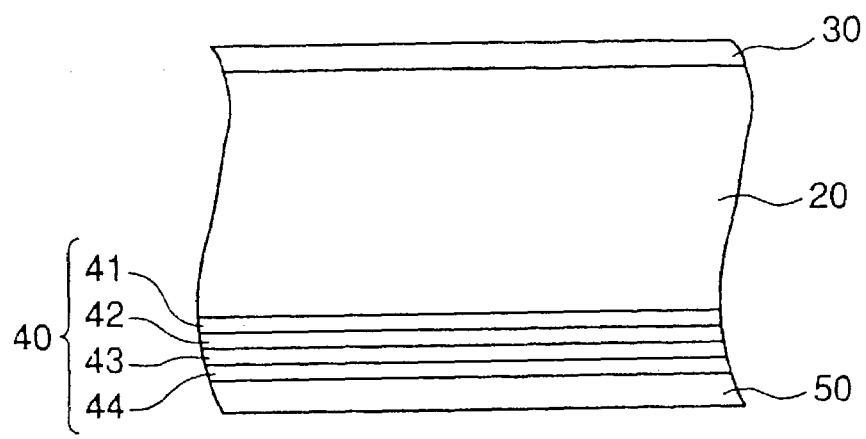
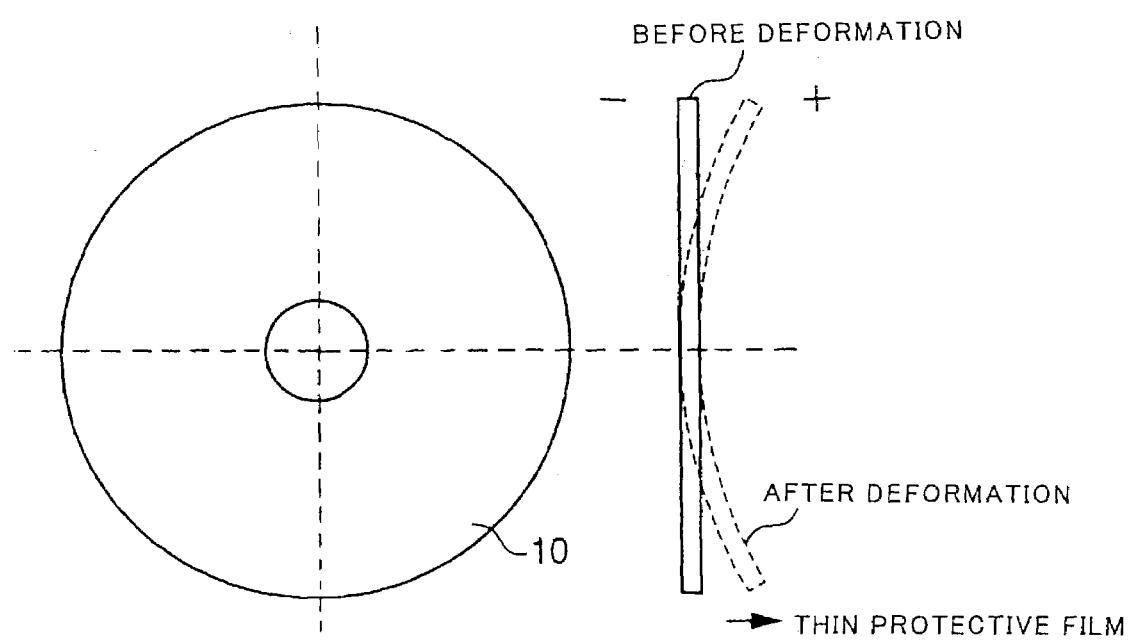
FIG. 2 (a)     FIG. 2 (b)

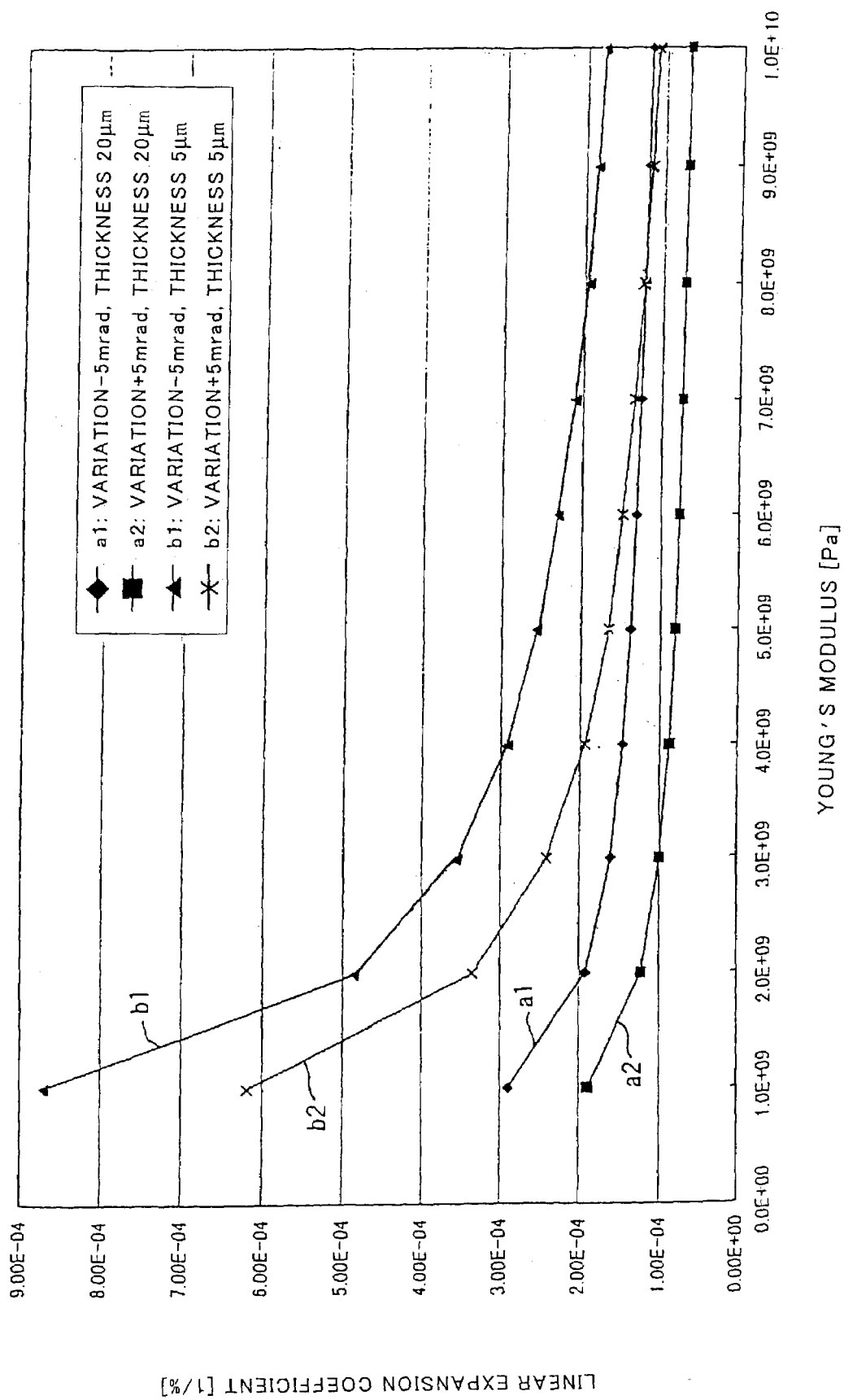

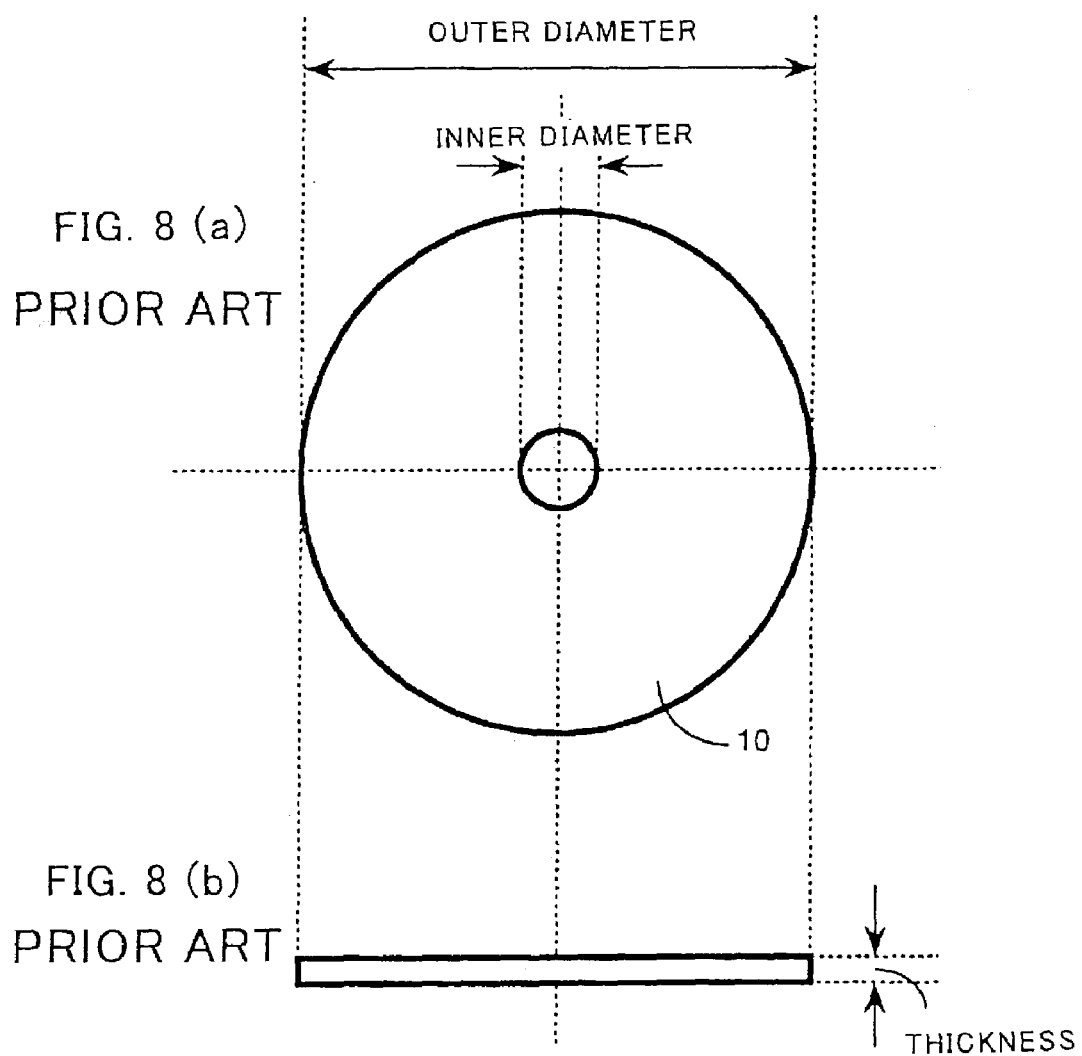
FIG. 8 (a) PRIOR ART
FIG. 8 (b) PRIOR ART
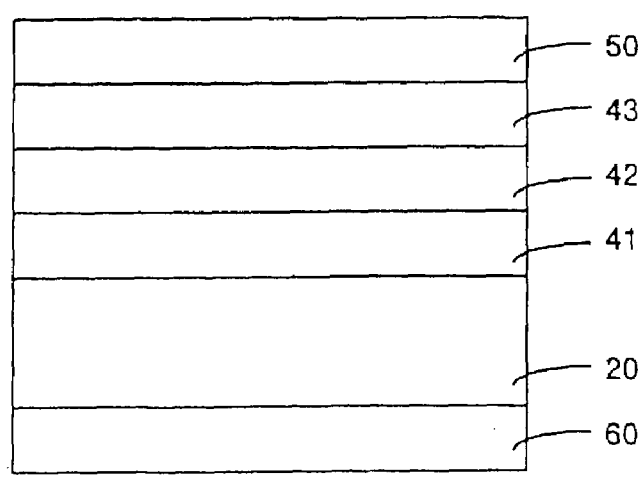
FIG. 9 PRIOR ART

FIG. 10 PRIOR ART

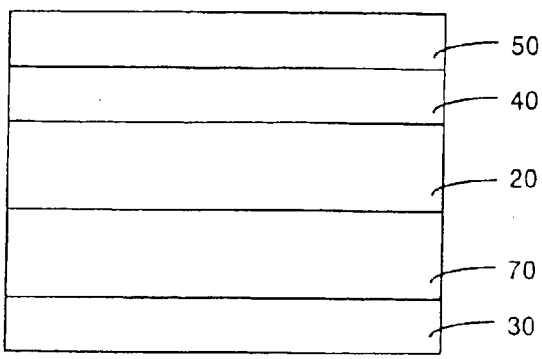

FIG. 11

| EXAMPLE 1 | MATERIAL | THICKNESS | YOUNG'S MODULUS (Pa) | LINEAR EXPANSION COEFFICIENT (1/°C) |
|---|---|---|---|---|
| TRANSPARENT SUBSTRATE 20 | POLYCARBONATE | 0.5mm | 2.41E+09 | 6.00E-05 |
| THIN FILM LAYER 40 | ALUMINUM NITIDE | 65nm | 3.43E+11 | 5.60E-06 |
| THIN PROTECTIVE FILM 50 | UV CURING RESIN 1 | 16 μm | 5.40E+09 | 9.50E-05 |

FIG. 12 PRIOR ART

| COMPARATIVE 1 | MATERIAL | THICKNESS | YOUNG'S MODULUS (Pa) | LINEAR EXPANSION COEFFICIENT (1/°C) |
|---|---|---|---|---|
| TRANSPARENT SUBSTRATE 20 | POLYCARBONATE | 0.5mm | 2.41E+09 | 6.00E-05 |
| THIN FILM LAYER 40 | ALUMINUM NITIDE | 65nm | 3.43E+11 | 5.60E-06 |
| THIN PROTECTIVE FILM 50 | UV CURING RESIN 2 | 16 μm | 5.40E+09 | 5.62E-05 |

FIG. 13

| EXAMPLE 2 | MATERIAL | THICKNESS | YOUNG'S MODULUS (Pa) | LINEAR EXPANSION COEFFICIENT (1/°C) |
|---|---|---|---|---|
| TRANSPARENT SUBSTRATE 20 | POLYCARBONATE | 0.5mm | 2.41E+09 | 6.00E-05 |
| THIN FILM LAYER 40 | ALUMINUM NITIDE | 65nm | 3.43E+11 | 5.60E-06 |
| THIN PROTECTIVE FILM 50 | UV CURING RESIN 3 | 16 $\mu$m | 9.00E+09 | 5.68E-05 |

INFORMATION PROCESSING MEDIUM AND INFORMATION PROCESSING APPARATUS USING THE SAME

CROSS-REFERENCE TO RELATED APPLICATION

This application is related to Japanese patent application No. 2002-138623 filed on May 14, 2002 whose priority is claimed under 35 USC § 119, the disclosure of which is incorporated by reference in its entirety.

BACKGROUND OF THE INVENTION

1. Field of the Invention

The present invention relates to an information processing medium for recording and reproducing information, and more particularly, it relates an information processing medium capable of preventing its skew caused by a change in ambient conditions and a lapse of time. The information processing mediums of the present invention include a medium for transmitting and creating information other than a medium for recording and reproducing information. Further, the present invention relates to an apparatus processing information by using such an information processing medium or an information processing apparatus having incorporated therein such an information processing medium.

2. Description of Related Art

FIG. 1 is a schematic sectional view illustrating a structure of an optical data recording medium. A conventional optical data recording medium is shown in a plan view of FIG. 8(a) and a side view of FIG. 8(b).

An optical data recording medium 10 comprises, as shown in FIG. 1 and FIGS. 8(a) and 8(b), a single layered or multilayered thin film layer 40 including at least any one of dielectric films 41, 43 (silicon nitride), a recording film 42 (TbFeCo) and a reflective film 44 (Al) formed by sputtering or the like on a disc-shaped substrate 20 made of a polycarbonate. On the thin film layer 40, a thin protective film 50 such as a resin film is formed. Further, a subject protective film 30 such as a resin film is formed on a light receiving surface of the substrate.

The substrate 20 is about 1.2 mm thick, the single layered or multilayered thin film layer 40 formed by sputtering is 10–300 nm thick, the thin protective film 50 is 1–30 μm thick, and the substrate protective film 30 is 1–30 μm thick. The polycarbonate substrate 20 constitutes almost the entire thickness of the optical data recording medium.

Therefore, rigidity of the medium substantially depends on that of the polycarbonate substrate 20. With the sufficient thickness of the polycarbonate substrate 20, deformation of the medium caused by a change in ambient conditions (temperature and humidity) is very small and there is no need to pay attention to a balance between stresses and bending moments generated in the layers.

In recent years, however, data recording and reproducing at high density on and from the optical data recording medium have been required. Accordingly, attempts to increase NA of an objective lens and decrease the substrate thickness have been made for reducing a beam spot diameter.

In general, the effective diameter (γ) of a laser beam incident on a disc medium is expressed as γ∝λ/NA with use of the wavelength (λ) of the laser beam and the NA of the objective lens.

In order to record information at a high density, it is necessary to reduce the wavelength λ of the laser beam and use an objective lens having a high NA. Merely increasing the NA results in coma that, when an angle formed by the objective lens with the disc is shifted, adversely affects recording. Coma is known to increase in proportion to the cube of the NA. To prevent coma, the thickness of the substrate needs to be set to $1/(NA)^3$.

The thickness of the substrate shows a tendency to decrease from a conventional dimension of 1.2 mm to an almost half or less, i.e., 0.6 mm or 0.5 mm so that information is recorded at a high density.

In such a case, the rigidity of the optical data recording medium depends upon not only that of the polycarbonate substrate 20 but also the stresses or bending moments generated in the layers. Such a medium will remarkably be warped if the ambient conditions (temperature and humidity) are changed. Therefore, it is important to establish an appropriate balance between the thicknesses and the like of the layers.

Japanese Unexamined Patent Publication No. Hei 4(1992)-195745 proposes a method of forming a dielectric film on a back surface of the substrate (where the thin film layer is not formed) for preventing the skew.

FIG. 9 shows a sectional view of an optical data recording medium according to the above publication. Components identical to those shown in FIG. 1 are indicated by the same reference numerals.

As shown in FIG. 9, a dielectric layer 60 is formed on a light receiving surface of a transparent polycarbonate substrate 20. The skew of the optical data recording medium is prevented by equalizing thermal expansion coefficients of a first dielectric film 41, a recording film 42 and a second dielectric film 43 formed on a surface opposite to the light receiving surface of the transparent substrate 20 with the thermal expansion coefficient of the dielectric layer 60 on the light receiving surface of the substrate.

Japanese Unexamined Patent Publication No. Hei 10(1998)-64119 describes forming the thin protective film 50 thick to reduce the skew caused by increase of the temperature of an optical disc. The constitution of this optical data recording medium is the same as that shown in FIG. 1. On the polycarbonate substrate 20, the thin film layer 40 is formed and then the thin protective layer 50 is formed to a thickness of about 30 μm to 50 μm. The increased thickness of the thin protective layer 50 is intended for establishment of a balanced with the thermal expansion coefficient of the polycarbonate substrate 20 so as to reduce the skew of the disc.

FIG. 10 shows a sectional view of another conventional optical data recording medium according to Japanese Unexamined Patent Publication No. Hei 4(1992)-364248.

The recording medium comprises a substrate 20, a thin film layer 40, a thin protective film 50 and a substrate protective film (a dielectric layer) 30. For preventing the skew caused by a change in humidity, an anti-permeation film 70 made of $SiO_2$ or AlN is formed between the substrate 20 and the substrate protective film 30.

In the above-mentioned conventional recording media according to both of the publications, the dielectric layer (30, 60) must be formed by sputtering or the like on the light receiving surface of the substrate. Accordingly, in the manufacture thereof, the thin film layer 40 is formed on a surface of the substrate and then the substrate is turned over to form the dielectric layer (60, 30) on an opposite surface. Therefore, the manufacture is complicated and the charge of the manufacture facility is raised, which increases the manufacture cost.

Further, in a method described in Japanese Unexamined Patent Publication No. Hei 10(1998)-64119, the thickness of a thin protective film 50 is too large so that the costs are increased, which complicates the manufacture.

Where the optical data recording medium is a magneto-optic data recording medium, it is desirable to bring a magnetic head coil adjacent to the thin film layer 40 in order to reduce the magnetic field and inductance of the magnetic head coil to reverse a magnetic field at high speed during data recording. Therefore, the thick protective film 50 results in the reduction of magnetic properties of the magneto-optic data recording medium and causes problems in the data recording and reproducing.

SUMMARY OF THE INVENTION

The present invention has been made under these circumstances, and it is an object of the present invention to provide an information processing medium which is easily manufactured and capable of preventing the deformation (skew) caused by a change in temperature and humidity, and an information processing apparatus using the same.

The present invention provides an information processing medium comprising a substrate, a single layered or multi-layered thin film layer formed on the substrate, and a thin protective film formed to cover at least on surface of the thin film layer, wherein the thin protective film is mainly comprised of a synthetic resin, and at least either one of a Young's modulus and a linear expansion coefficient of the thin protective film has a value compensating a radial skew variation of the substrate caused by a change in ambient conditions.

Also, the present invention provides an information processing medium comprising a substrate, a single layered or multilayered thin film formed on the substrate, and a thin protective film layer formed to cover at least on surface of the thin film layer, wherein the thin protective film is mainly comprised of a synthetic resin, and a linear expansion coefficient α of the thin protective film when a Young's modulus of the substrate is given as $E_1$ (Pa) is $-7.0 \times 10^{-15} \times E_1 + 1.0 \times 10^{-1} \leq \alpha \leq 2.0 \times 10^{-14} \times E_{31} + 4.0 \times 10^{-4} (1/°C.)$.

According to the present invention, the deformation (skew) of a medium itself can be prevented to such a degree that substantial influences are not caused to the data recording and reproducing, which improves reliability of the medium as compared with that of the prior art media.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a schematic sectional view illustrating a structure of an optical data recording medium;

FIGS. 2(a) and (b) are a view illustrating how the optical data recording medium is warped;

FIG. 7 is a graph illustrating a relationship between a linear expansion coefficient and a Young's modulus of the medium according to Example 1;

FIGS. 8(a) and 8(b) are a plan view and a side view each illustrating a structure of a conventional optical data recording medium;

FIG. 9 is a schematic sectional view illustrating a conventional optical data recording medium;

FIG. 10 is a schematic sectional view illustrating another conventional optical data recording medium;

FIG. 11 is a table illustrating settings of components of the medium according to Example 1 of the present invention;

FIG. 12 is a table illustrating settings of components of the conventional medium;

FIG. 13 is a table illustrating settings of components of the medium according to Example 2 of the present invention;

DESCRIPTION OF THE PREFERRED EMBODIMENTS

Figure 3:
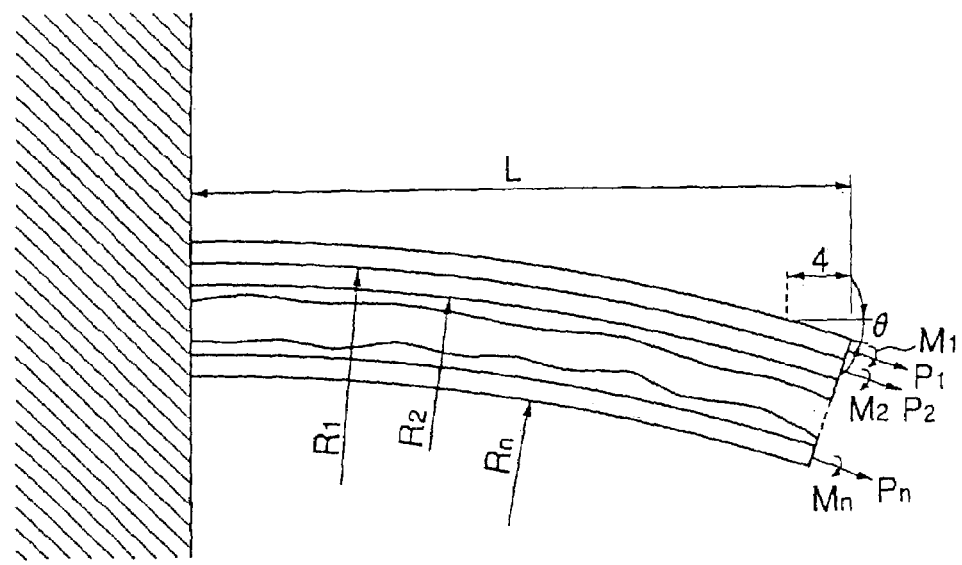
FIG. 3 is a view illustrating a multilayered beam.

According to the present invention, it is necessary that the relationship between the thin protective film and the substrate satisfies any one of the following conditions:

(a) the linear expansion coefficient of the thin protective film>the linear expansion coefficient of the substrate;

(b) the Young's modulus of the thin protective film>the Young's modulus of the substrate; and (c) the linear expansion coefficient of the thin protective film>the linear expansion coefficient of the substrate and the Young's modulus of the thin protective film>the Young's modulus of the substrate. In any of the conditions (a), (b) and (c), the linear expansion coefficient of the thin protective film is preferably in the range of $7.0 \times 10^{-5}$ (1/°C.) to $5.0 \times 10^{-4}$ (1/°C.) in view of practical prevention of the skew.

The Young's modulus $E_2$ of the thin protective film is preferably greater than $2.0 \times 10^9$ (Pa) and smaller than $1.0 \times 10^{10}$ (Pa) in view of prevention of the skew. Also in this case, any one of the above-mentioned conditions (a), (b) and (c) can be satisfied and the Young's modulus is preferably in the above-mentioned range.

The expansion coefficient β under humidity of the thin protective film (ratio of expansion (1/%) thereof where a difference of relative humidity (vapor content/saturated vapor amount at 25° C.) is increased by 1%) is preferably $\beta \leq 2.0 \times 10^{-14} \times E_1 + 3.0 \times 10^{-5}$ in view of prevention of the skew of medium.

In addition to the above conditions, the Young's modulus $E_1$ of the substrate may be such that $E_1 < 10.0 \times 10^9 (Pa)$.

The thin protective film may cover also all or part of a circumferential side surface of the substrate.

Further, the linear expansion coefficient $\alpha$ of the thin protective film may be 1.2 to 3 times as great as that of the substrate, and the substrate may be made of a polycarbonate or a polyolefin and has a thickness of 0.4 mm to 0.6 mm.

Here, the thin protective film 50 has a thickness of 5 μm or more to 20 μm or less. The substrate may be made of a polycarbonate or a polyolefin. In addition to a transparent substrate, the substrate may be a substrate which is not transparent such as a polycarbonate, a polyethylene or an acrylic substrate having a colorant added thereto. In order to effectively prevent the skew of the medium, the thin protective film is made of a material satisfying the above-mentioned linear expansion coefficient and Young's modulus. Examples of such a material include an ultraviolet light curing resin mainly comprised of polyester acrylate, epoxy acrylate, urethane acrylate, or polyether acrylate.

According to the present invention, the information processing medium refers to a medium for recording, transmitting, creating, converting and reproducing information therein. Examples of the information processing medium of the present invention include optical data recording media such as a CD-ROM, a DVD-RAM and a DVD-ROM; magnetic recording media such as a MO and a hard disc; magnetic cards such as a credit card; semiconductor media such as a flash memory; communication apparatus; and low-profile printed substrates such as an external interface module.

Examples of the information processing apparatus include: apparatus having incorporated inside the information processing medium of the present invention (including apparatus having inserted therein the information processing medium) such as an apparatus which drives the medium, records information on the medium, or reproduces the information; substrates and apparatus having incorporated therein a circuit module for creating, receiving or transmitting information with use of the information processing medium of the present so that the apparatus transmits or creates the information; and information processing modules and systems constituted by combining the above apparatus as required.

According to the invention, the term "circumferential side surface" refers to a portion of a medium at its outermost periphery determining the shape thereof, and therefore, in a plate-like medium such as a CD-ROM, for example, it refers to a side surface thereof at its outermost periphery, i.e., a circular side surface in a thickness direction.

Where it is mentioned that the thin protective film covers all a circumferential side surface of the medium, it means that the thin protective film is not only formed on a top circular of the thin film layer but it covers all the circumferential side surface of the substrate in a thickness direction. Further, the thin protective film may cover all the circumferential side surface of the thin film layer and the substrate.

A description that the thin protective film covers part of the circumferential side surface of the medium means that the circumferential side surface of the medium includes a region which is not covered with the thin protective film. For example, regions having the same area may be covered with the same distance therebetween on the circumferential side surface of the medium, or regions having different areas may be covered with different distances therebetween on the circumferential side.

Hereafter, the present invention will now be explained in detail based on the preferred embodiments shown in the drawings. It should be understood that the present invention is not limited to the embodiments.

In the following examples, used as the substrate is a transparent substrate, and employed as an example of the information processing medium is an optical data recording medium. Here, the Young's modulus of the substrate is given as $E_1$, the Young's modulus of the thin protective film is given as $E_2$, the linear expansion coefficient of the thin protective film is given as $\alpha$, and the expansion coefficient under humidity of the thin protective film is given as $\beta$.

First, the deformation (skew) of the optical data recording medium through a change in temperature and its principle will be described.

The optical data recording medium intended by the present invention is comprised of, for example, a transparent substrate 20 made of a polycarbonate and a single layered or multilayered thin film layer 40 including dielectric films 41, 43 (aluminum nitride, silicon nitride), a recording film 42 (TbFeCo) and a reflective film 44 (Al alloy). The thin film layer is formed on the substrate by sputtering, as shown in FIG. 1. A thin protective film 50 mainly comprised of a resin is formed on the thin film layer 40. Further, a substrate protective film 30 mainly comprised of a resin is formed on a light receiving surface of the transparent substrate 20 to protect it.

Various media with the above-mentioned structure have been commercialized. Objects of the present invention includes: magneto-optical recording media such as a MD and a MO; media only for reproduction such as a CD, a DVD and a DVD-ROM in which the thin film layer 40 includes only the reflective film 44 (Al or the like); write-at-once optical media such as a CD-R and a DVD-R in which the thin film layer 40 includes an organic pigment film and the reflective film 44 (Au, Ag); and phase change optical recording media such as a CD-RW, a DVD-RW, a DVD-RAM and a DVR in which the thin film layer 40 includes the dielectric films 41, 43 ($ZnS$—$SiO_2$ or the like), the recording film 42 (GeSbTe, AgInSb or the like) and the reflective film 44 (Al alloy or the like).

The optical data recording medium is formed of multiple layers as described above. The layers are different in physical property such as a linear expansion coefficient and in stress generated in the layers by a change in temperature.

In general, the transparent polycarbonate substrate 20, the substrate protective film 30 and the thin protective film 50 each show the linear expansion coefficient greater than that of the single layered or multilayered thin film layer 40. Accordingly, the expansion of the single layered or multilayered thin film layer 40 in a direction of a substrate radius is much smaller than that of the other layers.

Also, the thickness of the transparent substrate 20 is much greater than that of the substrate protective film 30 and that of the thin protective film 50. Further, films comprising the thin film layer 40 each show a Young's modulus extremely greater than that of the other layers. Accordingly, the deformation caused by a change in temperature is predominantly derived from the small expansion of the thin film layer 40 and the great expansion of the substrate 20. As a result, the skew of the optical data recording medium 10 is liable to occur in a direction perpendicular to a radial direction thereof, i.e., in a thickness direction thereof, toward the substrate protective film 30.

FIG. 2(a) is a plan view and FIG. 2(b) is a side view of the medium illustrating the skew of the medium. The direction of the skew of the medium toward the substrate protective film 50 is defined as a plus (+) direction and the direction toward the thin protective film 30 (light receiving surface) is defined as a minus (−) direction as shown in FIG. 2(b).

Where the linear expansion coefficient α, Young's modulus $E_2$ and thickness of the thin protective film 50 are suitably adjusted, bending moments of the transparent substrate 20 and the substrate protective film 30 generated by a change in temperature are balanced with that of the thin protective film 50 with respect to a neutral plane, i.e., a plane perpendicular to the film thickness direction. Accordingly, the deformation caused by the temperature change (i.e., the skew in the film thickness direction perpendicular to the radius direction of the optical data recording medium 10 toward the substrate protective film) may possibly be alleviated.

In view of the above for the purpose of reducing the skew of the medium through the temperature change, the following rough calculation is carried out to obtain appropriate values of the linear expansion coefficient α, Young's modulus $E_2$ and thickness of the thin protective film 50.

Stresses are generated in a radius direction (axial force), a circumference direction and a film thickness direction in the optical data recording medium 10. Since the medium 10 is disc-shaped, the stress in the circumference direction is uniform in the circumference. Further, the stress in the film thickness direction is also applied uniformly in each layer. Accordingly, it is assumed that these stresses do not contribute to the deformation. Therefore, it is considered that the deformation, i.e., the skew of the medium 10 (toward the substrate protective film (− direction) in the film thickness direction perpendicular to the radius direction of the optical data recording medium 10; evaluated by a radial skew θ), is substituted with skew of a multilayered beam having a cross section corresponding to that of the medium. FIG. 3 shows such a multilayered beam.

The multilayered beam of FIG. 3 includes n layers. The n signifies the number of layers comprising the optical data recording medium. In the medium shown in FIG. 1, n is 7.

The radial skew θ in the multilayered beam through a change in temperature is expressed by the formulae (1) to (5) obtained from the balance between axial force Pi (i=1, 2, 3, ..., n) and bending moment Mi in each layer ("Electronic Devices Utilizing Multilayered Beam Theory" Juhachi ODA, Kanazawa Univ., Japan Machine academy papers, vol. 59, 563, 1777–1782 pp., 1993).

Symbols in the formulae (1)–(5) have the following meanings:
$α_i$: linear expansion coefficient of an i-layer;
$E_i$: Young's modulus of the i-layer;
$t_i$: thickness of the i-layer;
$P_i$: axial force in the i-layer;
$M_i$: bending moment in the i-layer;
$R_i$: radius of curvature in the i-layer;
$I_i$: secondary moment of cross section of the i-layer;
b: beam width (defined as a unit length);
T: amount of temperature change (° C.);
L: beam length;
y: position of a neutral plane in the n layered beam; and
θ: radial skew at a beam length of 4 mm where the maximum skew is caused.

Since the thickness of each layer is much smaller than the radius of curvature, it is assumed that all the layers (i=1, 2, ..., n) have the same radius of curvature ($R_1=R_2=R_3=...R_n=R$). The amount T of temperature change is measured at a temperature (generally, −15° C. to 80° C.) in ambient conditions where the optical data recording medium is used.

In order to control the skew caused by a change in temperature, Young's modulus $E_2$, linear expansion coefficient α, and the film thickness of the thin protective film 50 are selected by using the above formulae (1)–(5) such that the radial skew θ is reduced. That is, these formulae allow selecting the Young's modulus and the like in order to arrange the position of the neutral plane (y) within the thin film layer during the temperature change. Moreover, it is expected that the deformation of the thin film layer 40 showing the lowest deformation speed among the layers in the medium becomes very small, and the overshooting of displacement, which causes problems through an actual change in temperature, is also reduced.

Further, where the Young's modulus $E_2$ and the linear expansion coefficient α of the thin protective film 50 are set greater than those of the substrate 20 by using the formulae (1)–(5), the position of the neutral plane (y) is arranged within the thin film layer 40 such as a recording film even if the thin protective film 50 is thin, which allows prevention of the skew.

Optical data recording media manufactured according to the above principle will be described by way of examples.

In the examples of the present invention, it is assumed that the thin film layer 40 comprises only one single layer of aluminum nitride. This is because in general, the deformation of the thin film layer 40 is caused mainly by its dielectric layer of aluminum or the like in many cases. Therefore, it $$Mi = \frac{E i I i}{R i} \tag{1}$$

$$α_i T + \frac{Pi}{b t i E i} - \frac{ti}{2 R i} = α_{i+1} T + \frac{P_{i+1}}{b t_{i+1} E_{i+1}} + \frac{t_{i+1}}{2 R_{i+1}} \tag{2}$$

$$\sum_{i=1}^{n} Pi = 0 \tag{3}$$

$$\sum_{i=1}^{n} Mi + P_1\left[y - \frac{t_1}{2}\right] + P_2\left[y - t_1 - \frac{t_2}{2}\right] + ... + P_n\left[y - t_1 - t_2 - ... - \frac{t_n}{2}\right] = 0 \tag{4}$$

$$θ = \tan^{-1}\left[\frac{L - 2}{R}\right] \tag{5}$$

does not present any problem to consider that a similar deformation will occur even if the thin film layer 40 has a multilayered structure. Here, the optical data recording media of the examples do not include the substrate protective film 30. If the substrate protective film 30 is provided, the thicknesses of the other layers (in particular the thin protective film 50) must be determined appropriately in view of the presence of the substrate protective film 30.

EXAMPLE 1

On a polycarbonate substrate (the transparent substrate 20) an aluminum nitride thin film layer (the thin film layer 40) and an ultraviolet light (UV) curing resin 1 (the thin protective film 50) which is designed on the basis of the formulae (1)–(5) are formed to provide an optical data recording medium of Example 1. Further, an optical data recording medium of Comparative Example 1 is provided by forming an aluminum nitride thin film layer and a conventional UV curing resin 2 (the thin protective film 50) on a polycarbonate substrate. FIGS. 11 and 12 describe the structures of the media according to Example 1 and Comparative Example 1, respectively.

As seen in FIGS. 11 and 12, the two optical data recording media are different in linear expansion coefficient of the UV curing resin (the thin protective film 50). The optical data recording medium of Example 1 specified in FIG. 11 has the greater linear expansion coefficient than that of the comparative medium. In both media, the transparent substrate 20 has an internal diameter of 8 mm, an external diameter of 50 mm and a thickness of 0.5 mm. However, the substrate may have a thickness of about 0.4 mm to 0.6 mm.

In the optical data recording medium according to Example 1 of the present invention, selected is the thin protective film 50 having a linear expansion coefficient α of $9.50 \times 10^{-5}$ which is greater than that of the conventional UV curing resin 2 and a thickness of 16 µm which is determined by the formulae (1)–(5). For comparison with the conventional optical data recording medium specified in FIG. 12, the two media are subjected to a change in ambient conditions such that the temperature increases from 25° C. to 70° C. Thus, variation (Δθ) of the radial skew θ (see FIG. 3) at the circumference (r=24 mm) through a lapse of time is measured.

Figure 4:
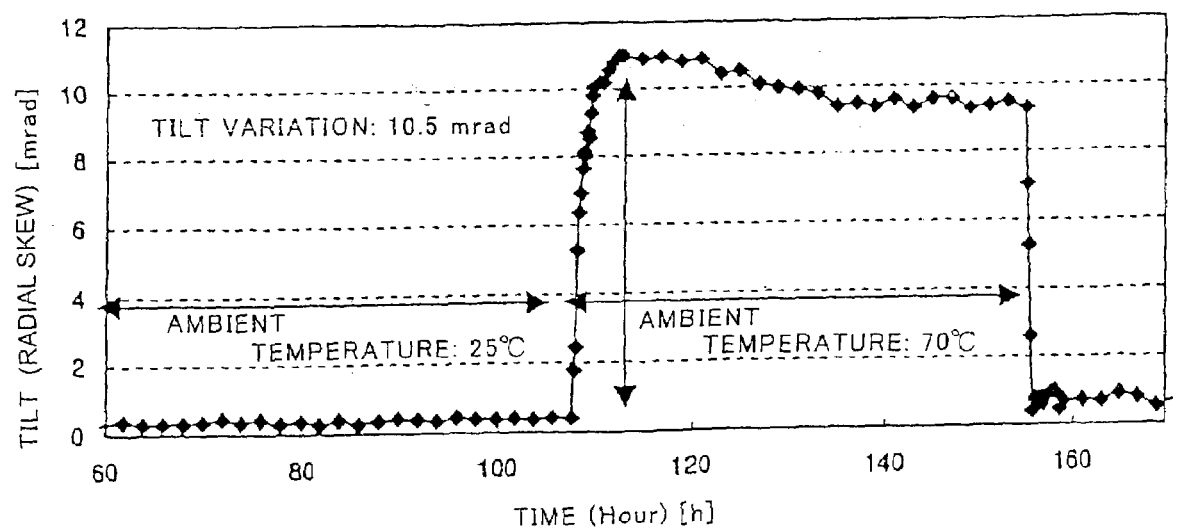
FIG. 4 is a graph illustrating a time dependency of a radial skew of a conventional medium through a change in temperature (indicating a low linear expansion coefficient)
Figure 5:
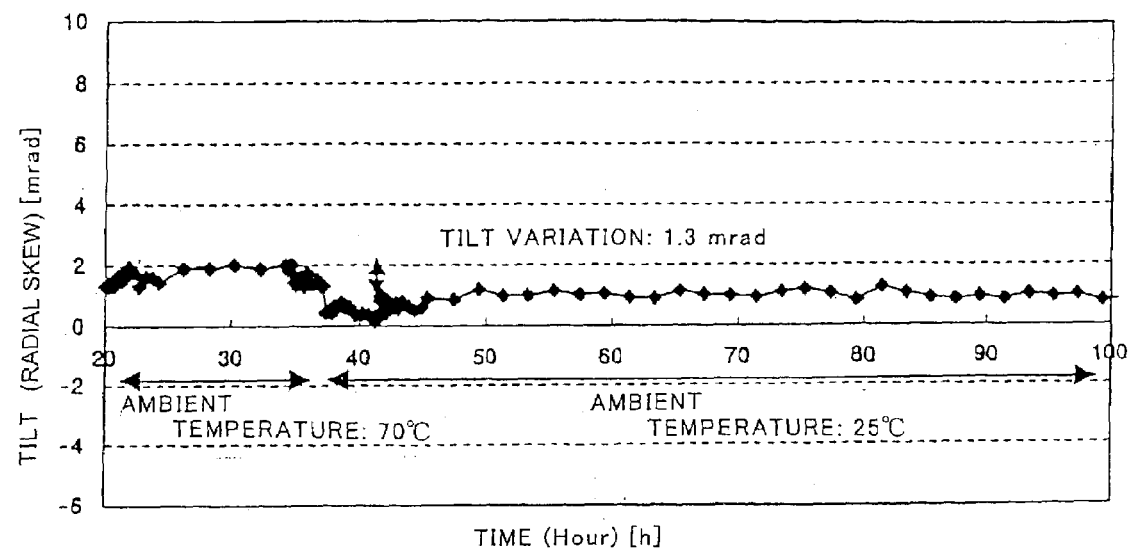
FIG. 5 is a graph illustrating a time dependency of a radial skew of a medium according to Example 1 of the present invention through a change in temperature (indicating a high linear expansion coefficient)

FIGS. 4 and 5 each show a graph illustrating a relationship between the variation of the radial skew (tilt with respect to the radius direction: mrad) and time (hour) under a change in temperature. The graph of FIG. 4 is of the conventional optical data recording medium of FIG. 12 and the graph of FIG. 5 is of the optical data recording medium according to Example 1 of the present invention of FIG. 11.

The radial skew in a plus quantity indicates that the medium is warped toward the thin protective film 50 and the radial skew in a minus quantity indicates that the medium is warped toward the opposite direction, i.e., the substrate protective film (light receiving surface).

According to FIGS. 4 and 5, the conventional medium and the medium of the invention show linear expansion coefficients of $5.62 \times 10^{-5}$ (1/° C.) and $9.50 \times 10^{-5}$ (1/° C.), respectively.

That is, FIG. 4 indicates that the thin protective film 50 in the conventional medium exhibits a low linear expansion coefficient, whereas FIG. 5 indicates that the thin protective film 50 in the medium according to the present invention exhibits a high expansion coefficient.

Referring to FIG. 4, the radial skew is varied to about +10 mrad when the ambient temperature is increased to 70° C., which indicates that the conventional medium is greatly warped toward the thin protective film 50.

In contrast, referring to FIG. 5, the radial skew is varied to about +2 mrad or less even if the ambient temperature is raised to 70° C., which indicates that the skew of the medium of the present invention toward the thin protective film 50 is very small.

According to the optical data recording medium of the present invention, the variation of the radial skew is very small as compared with the medium of Comparative Example 1 even if the temperature is changed in the same manner. That is, in the medium of the present invention, the deformation is inhibited even if the thickness of the thin protective film 50 is 20 µm or less.

FIG. 7 shows a graph illustrating a relationship between the linear expansion coefficient and the Young's modulus of the optical data recording medium according to Example 1 of the present invention specified in FIG. 11. In FIG. 7, curve a1 is derived from a medium with the thin protective film 50 of a 20 µm thickness and a radial skew variation of −5 mrad, curve a2 is derived from a medium with the thin protective film 50 of a 20 µm thickness and a radial skew variation of +5 mrad, curve b1 is derived from a medium with the thin protective film 50 of a 5 µm thickness and a radial skew variation of −5 mrad, and curve b2 is derived from a medium with the thin protective film 50 of a 5 µm thickness and a radial skew variation of +5 mrad.

Where the thickness of the thin protective film 50 is in the range of 5–20 µm, the relationship between the linear expansion coefficient and the Young's modulus is plotted between the curves a2 and b1. In order to settle the variation of the radial skew within the range of ±5 mrad, the linear expansion coefficient and the Young's modulus need to be adjusted appropriately such that the relationship therebetween is plotted between the curves a1 and a2 when the thickness of the thin protective film 50 is 20 µm, and between the curves b1 and b2 when the thickness of the thin protective film 50 is 5 µm.

Suppose that the Young's modulus is fixed to $2.0 \times 10^9$ (Pa) and the thickness of the thin protective film 50 is 20 µm, the linear expansion coefficient α of the thin protective film 50 is preferably greater than that of the transparent substrate and within the range of about $1.2 \times 10^{-4}$ (1/° C.) to $2.0 \times 10^{-4}$ (1/° C.). Likewise, when the thickness of the thin protective film 50 is 5 µm, the linear expansion coefficient α of the thin protective film 50 is preferably greater than that of the transparent substrate and within the range of about $3.2 \times 10^{-4}$ (1/° C.) to $4.9 \times 10^{-4}$ (1/° C.).

Accordingly, in order to control the radial skew variation in the range of ±5 mrad when the thin protective film 50 is 5–20 µm thick, the linear expansion coefficient α of the thin protective film 50 is preferably greater than that of the transparent substrate 20, greater than $7.0 \times 10^{-5}$ (1/° C.) and smaller than $5.0 \times 10^{-4}$ (1/° C.). More preferably, the linear expansion coefficient α is greater than $1.0 \times 10^{-4}$ (1/° C.) and smaller than $2.0 \times 10^{-4}$ (1/° C.), i.e., about 1.2 to 3 times as great as that of the transparent substrate 20 ($6 \times 10^{-5}$ (1/° C.)). Still more preferably, the linear expansion coefficient is about 1.5 to 2 times as great as that of the transparent substrate. Specifically, the linear expansion coefficient α is preferably set to about 1.6, 1.7 or 1.8 times as great as that of the transparent substrate 20.

As described above, the thin protective film 50 is selected to have the linear expansion coefficient within the appropriate range. Therefore, the skew of the optical data recording medium is controlled within an appropriate range wherein substantial influences are not caused to the data recording and reproducing.

EXAMPLE 2

Hereinafter, explanation is given to an optical data recording medium utilizing a UV curing resin 3 exhibiting a high Young's modulus. FIG. 13 shows the structure of the medium according to Example 2.

Comparing the medium of Example 2 specified in FIG. 13 and the medium of Comparative Example 1 in FIG. 12, they are different in material of the UV curing resin comprising the thin protective film 50. Further, the Young's modulus of the medium of Example 2 ($9.00 \times 10^9$ (Pa)) is greater than that of the medium of Comparative Example 1. That is, the thin protective film 50 in the medium of Example 2 exhibits a high Young's modulus.

Figure 6:
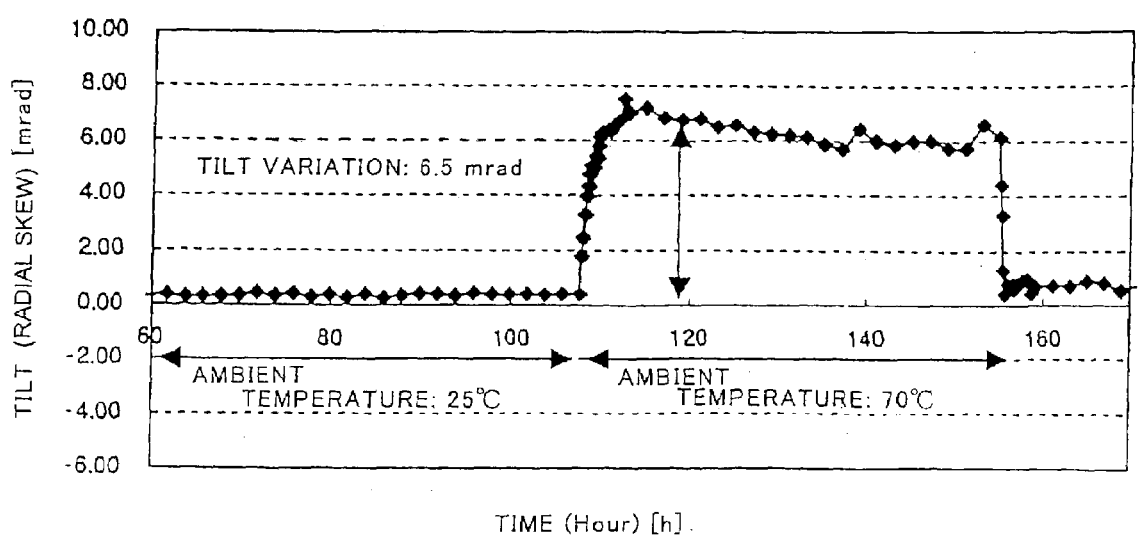
FIG. 6 is a graph illustrating a time dependency of a radial skew of a medium according to Example 2 of the present invention through a change in temperature (indicating a high Young's modulus)

FIG. 6 shows a graph illustrating a relationship between the variation of the radial skew (mrad) and time (hour) through a change in temperature.

In the same manner as in Example 1, the two media are subjected to a change in ambient conditions such that the temperature increases from 25° C. to 70° C. Then, the variation ($\Delta\theta$) of the radial skew $\theta$ at the circumference (r=24 mm) through a lapse of time is measured.

FIG. 6 shows that the radial skew is varied to about +6.5 mrad when the temperature is raised to 70° C., i.e., the medium is warped toward the thin protective film 50. However, the skew is smaller than that caused in the conventional medium shown in FIG. 4.

Further, the graph of FIG. 7 illustrating the relationship between the linear expansion coefficient and the Young's modulus indicates that, in order to control the radial skew variation to 5 mrad or less in the case where the thin protective film 50 is 5–20 μm thick, it is preferable that the thin protective film 50 has the Young's modulus $E_2$ greater than $2.0 \times 10^9$ (Pa) and smaller than $1.0 \times 10^{10}$ (Pa). It is more preferable that the thin protective film 50 has the Young's modulus $E_2$ in the range of $3.0 \times 10^9$ (Pa) to $6.0 \times 10^9$ (Pa).

To reduce the skew of the medium, it is necessary to appropriately select both the linear expansion coefficient $\alpha$ of the thin protective film 50 and the Young's modulus $E_1$ of the substrate 20.

Figure 15:
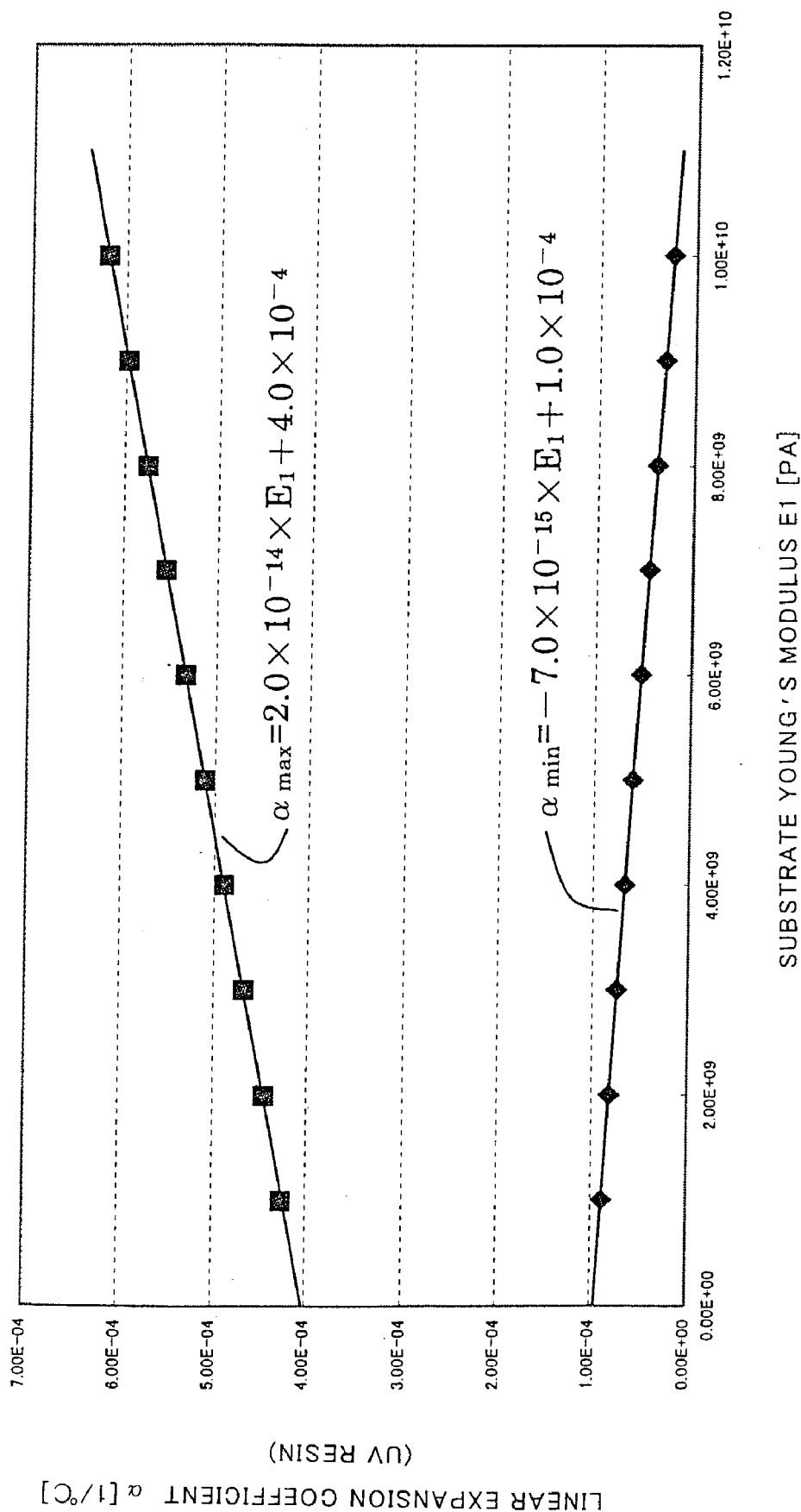
FIG. 15 shows a graph illustrating a variation of the linear expansion coefficient α of a thin protective film relative to a Young's modulus of a substrate according to Example 2.

FIG. 15 shows a graph illustrating a variation of the linear expansion coefficient $\alpha$ of the thin protective film relative to the Young's modulus $E_1$ of the substrate according to Example 2. It is assumed that the ambient temperature is 25° C. and the relative humidity is 50%.

Curve $\alpha$ max determining an upper limit of the linear expansion coefficient $\alpha$ (1/° C.) is expressed by the linear equation: $\alpha\,\text{max} = 2.0 \times 10^{-14} \times E_1 + 4.0 \times 10^{-4}$. A line segment expressed by this equation indicates a medium showing the radial skew variation of –5 mrad.

Curve $\alpha$ min determining a lower limit of the linear expansion coefficient $\alpha$ is expressed by the linear equation: $\alpha\,\text{min} = -7.0 \times 10^{-15} \times E_1 + 1.0 \times 10^{-4}$. A line segment expressed by this equation indicates a medium showing the radial skew variation of +5 mrad.

Accordingly, in order to settle the radial skew variation of the medium within the range of ±5 mrad, the linear expansion coefficient $\alpha$ of the thin protective film 50 is set to a value in the range between the curve $\alpha$ max and the curve $\alpha$ min when a value is selected as the Young's modulus $E_1$ of the substrate. More preferably, the linear expansion coefficient $\alpha$ is set within the range above a curve of $-7.0 \times 10^{-15} \times E_1 + 1.2 \times 10^{-4}$ to below a curve of $2.0 \times 10^{-14} \times E_1 + 3.6 \times 10^{-4}$ to control the skew of the medium more effectively.

EXAMPLE 3

Explanation is given to an example of the optical data recording medium of the present invention in such ambient conditions that the humidity as well as the temperature changes.

In general, the deformation of the medium is caused by a change in humidity as well as temperature. Therefore, the material of the thin protective film may be determined in consideration of the "expansion coefficient under humidity" as below derived from a humidity change in addition to the linear expansion coefficient derived from a temperature change.

As described above, the linear expansion coefficient is defined as a parameter in deformation of the substrate or the like in terms of temperature, whereas the expansion coefficient under humidity is defined as a parameter in deformation of the substrate or the like in terms of humidity. In other words, the expansion coefficient under humidity of the thin protective film is defined as a ratio of expansion (1/%) where a difference of relative humidity (vapor content/saturated vapor amount at 25° C.) is increased by 1%.

As described above, the formulae (1)–(5) are used to select the linear expansion coefficient of the thin protective film 50 so that the radial skew $\theta$ is controlled. Also, to settle the expansion coefficient under humidity in an appropriate range, similar formulae can be used which are provided by replacing the linear expansion coefficient $\alpha i$ in the formulae (1)–(5) by the expansion coefficient under humidity and replacing the amount T of temperature change by the amount (%) of humidity change.

As described above, the Young's modulus $E_2$ of the thin protective film 50 is preferably greater than the Young's modulus $E_1$ of the transparent substrate 20, greater than $2.0 \times 10^9$ (Pa), and smaller than $1.0 \times 10^{10}$ (Pa). When this preferable range of the Young's modulus is considered, the expansion coefficient under humidity is preferably greater than that of the transparent substrate 20 and smaller than $1.7 \times 10^{-4}$ (1/%).

From the above, it is preferable that the thin protective film 50 is selected so as to satisfy all of the following conditions (a)–(f) when the three deformation parameters of the linear expansion coefficient, expansion coefficient under humidity and Young's modulus are considered:

(a) the linear expansion coefficient $\alpha$ of the thin protective film 50 > the linear expansion coefficient of the transparent substrate 20;

(b) the expansion coefficient $\beta$ under humidity of the thin protective film > the expansion coefficient under humidity of the transparent substrate;

(c) the Young's modulus $E_2$ of the thin protective film > the Young's modulus $E_1$ of the transparent substrate;

(d) $7.0 \times 10^{-5}$ < the linear expansion coefficient $\alpha$ (1/° C.) of the thin protective film < $5.0 \times 10^{-4}$;

(e) 0 < expansion coefficient $\beta$ under humidity of the thin protective film < $1.7 \times 10^{-4}$ (1/%); and (f) $2.0 \times 10^9 \leq$ the Young's modulus $E_2$ (Pa) of the thin protective film $\leq 1.0 \times 10^{10}$.

Figure 14:
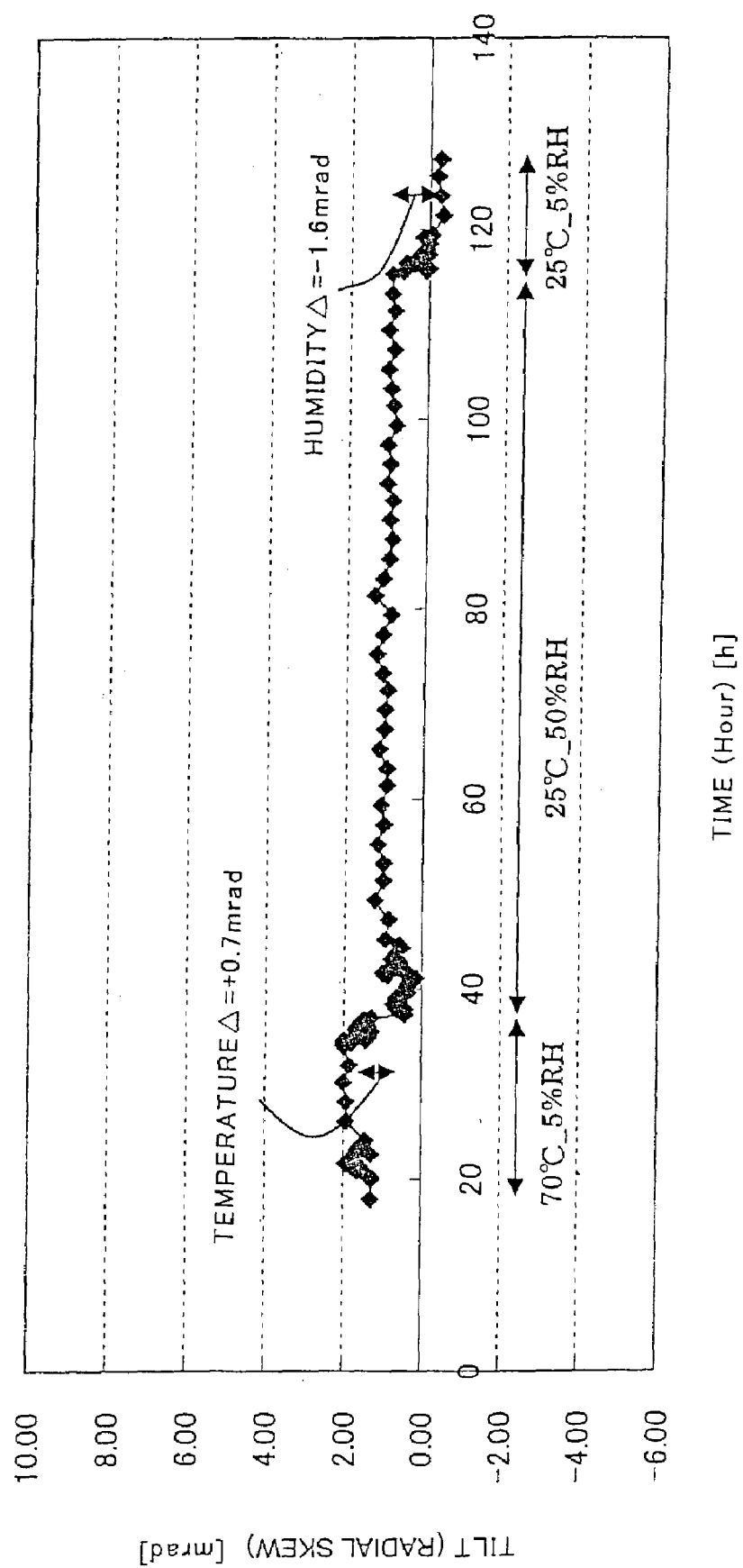
FIG. 14 is a graph illustrating a time dependency of a radial skew of a medium according to Example 3 of the present invention through a change in temperature and humidity.

For example, the thin protective film (UV curing resin) 50 was selected to satisfy the conditions (a)–(f) such that the linear expansion coefficient $\alpha$ thereof was $9.5 \times 10^{-5}$(1/° C.), the expansion coefficient $\beta$ under humidity was $1.6 \times 10^{-5}$ (1/%), and the Young's modulus was $5.4 \times 10^9$ (Pa), with a result that the variation of the radial skew of an optical data recording medium using this thin protective film was within the range of +0.7 mrad to −1.6 mrad under a change in temperature (from 25° C. to 70° C.) and relative humidity (from 50% to 90%), as shown in FIG. 14. At this time, the linear expansion coefficient of the transparent substrate 20 was set to $6.0\times10^{-5}$ (1/%), the expansion coefficient under humidity of the transparent substrate 20 was set to $7.0\times10^{-6}$ (1/%), and the Young's modulus $E_1$ of the transparent substrate 20 was $2.41\times10^9$ (Pa). The thickness of the transparent substrate 20 was set to 0.5 mm and the thickness of the thin protective film 50 was set to 16 μm.

Thus, the radial skew variation of the medium falls within the range of ±5 mrad also in this example in the same manner as in the above examples. Therefore, the skew of the optical data recording medium is controlled within an appropriate range wherein substantial influences are not caused to the data recording and reproducing.

Figure 16:
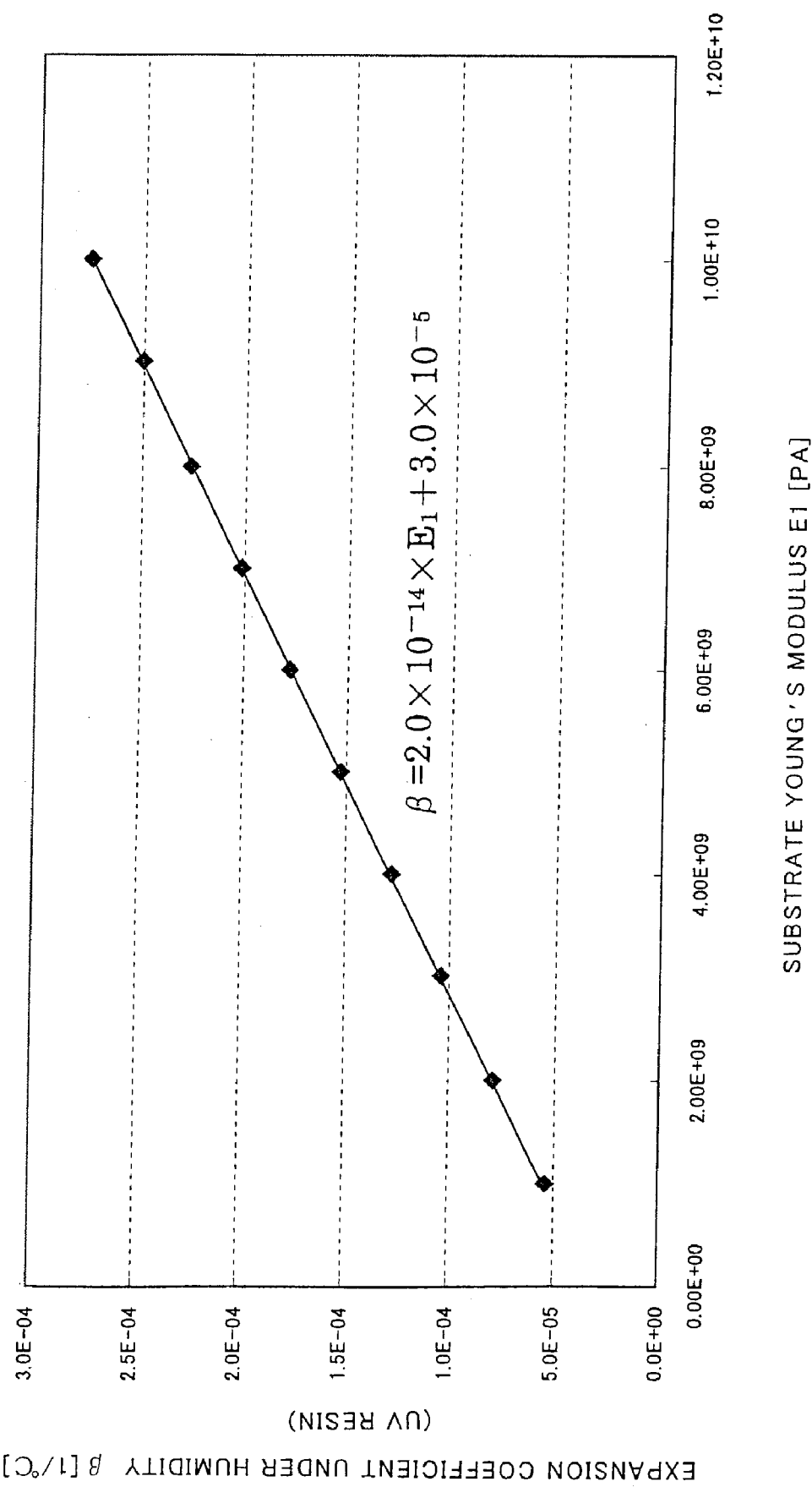
FIG. 16 shows a graph illustrating a variation of the expansion coefficient under humidity of the thin protective film relative to a Young's modulus of a substrate according to Example 3 of the present invention.

FIG. 16 shows a graph illustrating a variation of the expansion coefficient β under humidity of the thin protective film 50 relative to the Young's modulus $E_1$ of the substrate 20 according to Example 3 of the present invention.

When the expansion coefficient β under humidity is set in the range below a curve of FIG. 16, the radial skew variation of the medium is ±5 mrad.

The curve of FIG. 16 is expressed by the linear equation: $\beta = 2.0\times10^{-14}\times E_1 + 3.0\times10^{-5}$.

When the expansion coefficient β (1/%) under humidity of the thin protective film 50 relative to the Young's modulus $E_1$ of the selected substrate 20 is set such that $\beta \leq 2.0\times10^{-14}\times E_1 + 3.0\times10^{-5}$, the radial skew variation of the medium is ±5 mrad. Accordingly, the radial skew variation is controlled in a range wherein substantial influences are not caused.

In the above embodiments, the Young's modulus $E_1$ of the substrate 20 is $2.41\times10^{-9}$(Pa), but it is not limited thereto. Even if the substrate has the Young's modulus $E_1$ smaller than $10.0\times10^9$(Pa) and greater than $5\times10^8$(Pa), the radial skew variation is controlled in the range of ±5 mrad.

The skew of the medium can be more appropriately controlled by combining as required such conditions as the linear expansion coefficient α, Young's modulus $E_2$ and expansion coefficient β under humidity of the thin protective film, and the Young's modulus $E_1$ of the substrate as described in the above examples.

For example, the substrate 20 and the thin protective film 50 may be selected so as to satisfy all of the following three formulae:

$$-7.0\times10^{-15}\times E_1 + 1.0\times10^{-4} \leq \alpha \leq 2.0\times10^{-14}\times E_1 + 4.0\times10^{-4}; \quad (a)$$

$$2.0\times10^9 \leq E_1 \leq 1.0\times10^{10}; \quad (b)$$

$$\beta \leq 2.0\times10^{-14}\times E_1 + 3.0\times10^{-5}. \quad (c)$$

In the above examples, the thin protective film 50 is formed on the thin film layer 40, and it may not only be formed on a top surface of the thin film layer 40 but cover the aforementioned circumferential side surface of the medium.

To form the thin protective film 50 on a circumferential side surface, the ultraviolet light curing resin comprised in the thin protective film 50 is applied on the thin film layer 40 by spin coating through a two-staged operation as below.

First, the spin coating is carried out at a low speed for a longer period (for example, 60 sec.) than taken for conventional spin coating so that the resin is spread over the entire area of the thin film layer.

Next, the spin coating is carried out at a high speed so as to control the thickness of the resulting thin protective film only for a predetermined period. This spin coating at a high speed allows applying the resin also on the circumferential side surface of the medium to form the thin protective film thereon as well.

Where the thin protective film is thus formed also on the circumferential side surface, the radial skew variation is controlled in the range of +0.5 mrad to −1.0 mrad, i.e., in an appropriate range wherein substantial influences are not caused. Therefore, the reliability of the medium can be improved in information recording and reproducing. The radial skew variation can also be reduced even when the thin protective film is formed on not all but part of the circumferential side surface.

According to the present invention, the Young's modulus and/or linear expansion coefficient of the thin protective film mainly of a synthetic resin is set to a value which compensates the skew of the substrate caused by a change in ambient conditions. Therefore, the skew of the information processing medium can be more controlled than conventionally, and consequently, the reliability thereof is improved in information recording and reproducing.

Further, according to the present invention, the linear expansion coefficient of the thin protective film and the Young's modulus of the substrate are set so as to satisfy a predetermined relationship. Therefore, even when the thin protective film is reduced in thickness to about 5 μm to 20 μm, the skew of the information processing medium can be more controlled than conventionally such that substantial influences are not caused to the information recording and reproducing, and consequently, reliability of the medium is improved in information recording and reproducing.

Moreover, according to the present invention, the Young's modulus or the expansion coefficient under humidity of the thin protective film are set in a predetermined range. Therefore, the skew of the information processing medium can be more controlled than conventionally such that substantial influences are not caused to the information recording and reproducing, and consequently, reliability of the medium is improved in information recording and reproducing.

What is claimed is:

1. An information processing medium comprising a substrate, a single layered or multilayered thin film layer formed on the substrate, and a thin protective film formed to cover at least on surface of the thin film layer, wherein the thin protective film is mainly comprised of a synthetic resin, and at least either one of a Young's modulus and a linear expansion coefficient of the thin protective film has a value compensating a radial skew variation of the substrate caused by a change in ambient conditions, wherein an expansion coefficient β under humidity of the thin protective film (ratio of expansion (1%) of the thin film protective film where a difference of relative humidity (vapor content/saturated vapor amount at 25° C.) is increased by 1%) is $\beta \leq 2.0\times2.0\times10^{-14}\times E_1 + 3.0\times10^{-5}$, wherein the Young's modulus of the substrate is given as $E_1$ (Pa).

2. An information processing medium of claim 1, wherein a linear expansion coefficient α of the thin protective film is $$-7.0\times10^{-15}\times E_1 + 1.0\times10^{-1} \leq \alpha \leq 2.0\times10^{-14}\times E_1 + 4.0\times10^{-4}(1/° C.).$$

3. An information processing medium according to claim 1, wherein the Young's modulus $E_2$ (Pa) of the thin protective film is $2.0\times10^9 \leq E_2 \leq 1.0\times10^{10}$.

4. An information processing medium according to claim 1, wherein the thin protective film covers also all or part of a circumferential side surface of the substrate.

5. An information processing medium according to claim 1, wherein the linear expansion coefficient α of the thin protective film is 1.2 to 3 times as great as that of the substrate, and the substrate is made of a polycarbonate or a polyolefin and has a thickness of 0.4 mm to 0.6 mm.

6. An information processing medium according to claim 1, wherein the thin protective film has a thickness of 5 μm or more to 20 μm or less.

7. An information processing medium according to claim 1, wherein the thin protective film is made of an ultraviolet light curing resin.

8. An information processing medium according to claim 1, wherein the thin film layer includes at least any one of a dielectric film, a recording film and a reflective film, and a radial skew variation of the information processing medium under a change in ambient temperature from 25° C. to 70° C. and ambient relative humidity from 50% to 90% is in a range of −5.0 mrad to +5.0 mrad.

9. An information processing apparatus having incorporated therein an information processing medium as set forth in claim 1.

10. An information recording medium comprising an information processing medium according to claim 1, wherein the thin film layer includes a layer for recording or reproducing information.

* * * * *